(No Model.)
A. KÖNIG.
DOUBLE IMAGE MICROMETER.
No. 587,443. Patented Aug. 3, 1897.
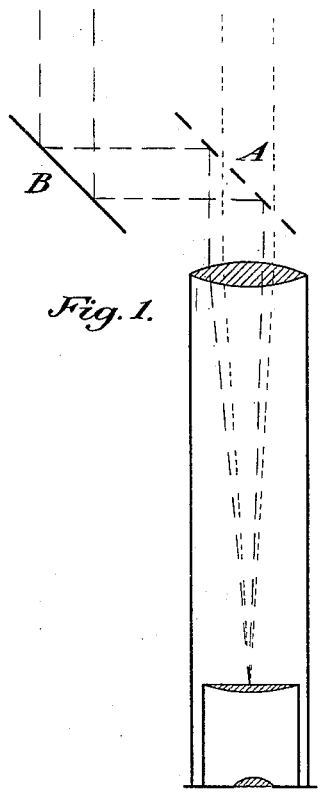
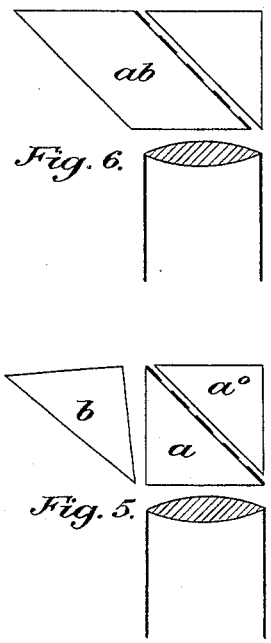
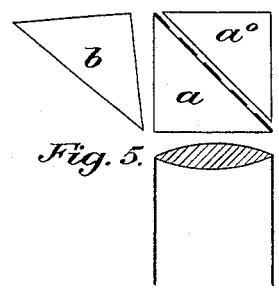
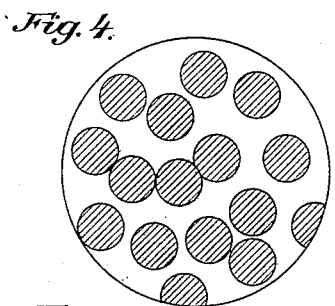
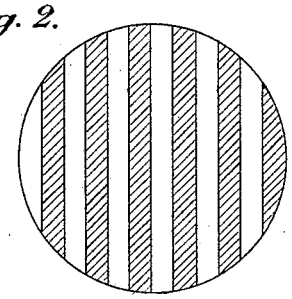
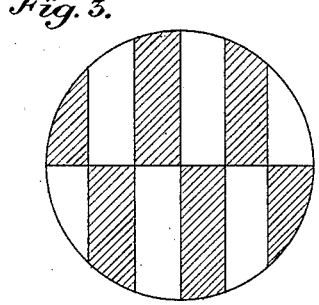
Witnesses:
Inventor:
Albert König

UNITED STATES PATENT OFFICE.

ALBERT KÖNIG, OF JENA, GERMANY, ASSIGNOR TO THE FIRM CARL ZEISS, OF SAME PLACE.

DOUBLE-IMAGE MICROMETER.

SPECIFICATION forming part of Letters Patent No. 587,443, dated August 3, 1897.

Application filed May 29, 1897. Serial No. 638,760. (No model.) Patented in Germany November 25, 1896, No. 92,867.

*To all whom it may concern:*

Be it known that I, ALBERT KÖNIG, doctor of philosophy, a subject of the King of Prussia, Emperor of Germany, residing at Jena, in the Grand Duchy of Saxe-Weimar, German Empire, have invented a new and useful Double-Image Micrometer, (for which I have obtained a patent in Germany, No. 92,867, bearing date November 25, 1896,) of which the following is a specification.

In order to produce double images for the measurement of angles by means of a telescope, every cone of rays entering the object-glass has hitherto been divided into two parts, the line of division being either one of the diameters of the object-glass, so that two semicircular halves were the result of division—as, for example, in the case of the heliometer, Helmholt's ophthalmometer, and the sextant—or a circle dividing the object-glass into two concentric zones, as in Moser's double-image micrometer. Both these arrangements, however, are attended with the drawback that the two images lying upon each other within the field of view of the telescope are produced by essentially different and totally separate portions of the object-glass of the telescope and are made perceptible to the observer by different parts of the cornea and the crystalline lens. As for this reason no identity of the dioptrical conditions of production exists for both images, differences in their position and size very frequently occur and interfere with the exact discernment of the coincidence of both images. Besides, where these methods of dividing the image-producing pencils of rays are adopted, by any lateral displacement of the observer's eye in relation to the axis of the telescope a portion of the rays of one of the images will be shut off. By this circumstance the cause of errors above mentioned becomes all the more apparent and the light is unequally distributed between the two images, so that observation of coincidence is rendered very difficult indeed.

The invention hereinafter described obviates these inconveniences. According to this invention each of the two areas of the object-glass aperture which are utilized in the production of one and the other image, respectively, is subdivided into a great number of partial areas uniformly distributed over the whole aperture, so that every part of this aperture participates in producing both images. Such distribution is rendered possible by means of an arrangement of mirrors used in a well-known form of camera lucida.

Figure 1 is a diagram showing the arrangement of the mirrors before the object-glass of the telescope. Figs. 2, 3, and 4 are specimens of various delineations of the surface of one of the mirrors. Fig. 5 is an arrangement of prisms substituted for the mirrors. Fig. 6 is another arrangement of prisms.

As represented in the diagram Fig. 1 two plane mirrors A and B are arranged in front of the object-glass of a telescope, one of which mirrors, B, uniformly reflects the rays of light throughout the whole of its area, while the surface of the other mirror, A, is composed of a great number of parts alternately reflecting and transparent, a result which may be readily obtained with an ordinary foliated glass mirror by removing many separate parts of the reflecting-coating. The transparent portions may vary in shape. For example, they may be streaks or circles, their arrangement also being optional, (say in rows or irregular,) the only condition being that within the periphery corresponding to the effective aperture of the object-glass the total area of the transparent portions should be approximately equal to the total area of the reflecting portions and that the centers of gravity of these two groups should coincide as nearly as possible, even though the observer's eye were to occupy an eccentric position in front of the eyepiece. Figs. 2, 3, and 4 exemplify some methods of dividing the surface of the mirror A into a great number of reflecting and of transparent sections.

As luminous rays from an object enter the object-glass through the transparent sections of the mirror-surface A without any deflection, while, on the other hand, luminous rays from the same object are reflected first by B and then by the non-transparent parts of A, the object-glass, in its focal plane, will delineate two images, which will be more or less displaced from their position of exact coincidence according to the angle of inclination existing between both mirrors. These images are produced at their coinciding points by rays taking a practically identical path within the telescope and the observer's eye, since to each ray contributing to the production of a certain point of one image always belongs another ray, which, starting from a closely-adjoining point of the object-glass aperture, assists in the production of that point of the other image which coincides with the said point of the first image. The two cones of rays by which coinciding points of the two images are generated thus penetrate each other, and they do so all the more completely the smaller the alternately transparent and non-transparent elements of the surface A or the greater the number of such elements. The more thoroughly the two pencils of rays thus penetrate each other the more the ratio of the degrees of luminosity of both images will be independent of the position of the observer's eye. As a matter of fact, even with a comparatively small number of alternately reflecting and transparent surface-sections, within that area of the mirror A which corresponds to the object-glass aperture the partial shutting off of the pencils of rays escaping from the eyepiece by the margin of the pupil, which is caused by an eccentric position of the eye, will affect the two images practically equally.

The reduction in size of the alternating elements in the specular surface A is somewhat limited by the aberration resulting from diffraction, which injures equally both images, the diffraction being a consequence of the splitted sectional area of the pencils of rays. Such aberration will not be perceivable in practice if the sections of the surface A are of such a size that their smallest dimensions, measured in that real image of this surface which, being reduced in proportion to the magnifying power of the telescope, is projected into the pupil of the observer's eye, are not less than three to two millimeters. However, the surface A may be divided into much minuter parts, and the effect of diffraction, although in such case being visible, may still be prevented from affecting the accuracy of the observation by arranging the sections of the surface in streaks or bands, as illustrated in Figs. 2 and 3, with the longitudinal direction of such streaks extending parallel to that diameter of the field of view in the direction of which the images are to be displaced in relation to each other for the purpose of angle measurement. In this arrangement aberrations, owing to diffraction, cannot have any injurious influence upon the observation of coincidence, inasmuch as the spreading of light only takes place at right angles to the direction of the separation of the images.

Again, the effect of a mirror-surface split up into infinitely small elements may be produced, and at the same time diffraction entirely eliminated, by arranging instead of alternately-reflecting and transparent elements elements of which each is partly transparent and partly reflecting. This may be effected by foliating the mirror-glass with a very thin layer of gold or other substance displaying powerful superficial reflection, while still being translucent (when the layer is sufficiently thin) for the brighter colors of the spectrum.

The arrangement substantially described above may be carried out by means of ordinary plano-parallel glass mirrors, each foliated on one side. In most cases, however, it will be found advantageous to substitute prisms for both mirrors, as illustrated in Fig. 5, or, at least, for the mirror A. Instead of the glass B Fig. 5 shows a single reflecting-prism $b$ of isosceles section, the hypotenuse side of which may either be free from any coating for total reflection or coated with metal. For the mirror A an isosceles prism $a$ should be substituted, the base surface of which is foliated, as above described—viz., either intermittently or with a uniform transparent coating. On the foliated surface of the prism $a$ another similar but unfoliated prism $a°$ is cemented, so that the whole arrangement has, in regard to the rays entering the telescope without deflection, the effect of a plano-parallel plate.

When the combination of mirrors or prisms is intended merely for the production of double images remaining in a constant relative position and is not to be used as an instrument for direct assistance in the process of angle measurement, the two prisms $a$ and $b$ (shown as separate in Fig. 5) are preferably joined to form a single glass piece $a\ b$, as represented in Fig. 6. The double images which will by such means be obtained will be displaced in relation to each other at a constant angle, which is independent of the position of the body of glass $a\ b$ in relation to the telescope, and only be determined by the angle of inclination of one of the reflecting-surfaces A and B in relation to the other. If in this arrangement a measurable variation of the displacement of one image in relation to the other is required, it must be brought about by means of a special deflecting device (such as a rotatable prism or the like) inserted into the path of the luminous rays in front of the compound prism.

It will be understood, however, that the combination of prisms or mirrors herein described may also be utilized for continually varying the difference of direction of both images and for measuring directly, on the principle of the sextant and the prismatic reflecting-circle, the said difference by constructing one of the two mirrors or prisms so that it may be turned for measurable angles about an axis at right angles to the optical axis of the telescope and parallel to the reflecting-surface of the other mirror or prism. For micrometric angle measurement in the special sense of measurement of small angles the requisite rotation is preferably performed with the mirror A or prism *a*, whereas the mirror B or prism *b* remains stationary.

What I claim, and desire to secure by Letters Patent of the United States, is—

1. The combination with a telescope of two surfaces, of which one is both reflecting and translucent and the other only reflecting, the first being arranged before the object-glass and the second aside of the first, this first surface consisting of reflecting and transparent sections arranged alternately, substantially as and for the purpose set forth.

2. The combination with a telescope of two surfaces, of which one is both reflecting and translucent and the other only reflecting, the first being arranged before the object-glass and the second aside of the first, this first surface consisting of a thin layer of metal, substantially as and for the purpose set forth.

3. The combination with a telescope of two surfaces, of which one is both reflecting and translucent and the other only reflecting, the first being arranged before the object-glass and the second aside of the first, this first surface being situated between two prisms cemented together and shaped so as to present plano-parallel outer surfaces to the rays of light, which pass through them in the direction of the telescope, substantially as and for the purpose set forth.

In testimony whereof I have hereunto set my hand in the presence of two subscribing witnesses.

ALBERT KÖNIG.

Witnesses:
 ERNEST ABBE,
 MAX FISCHER.